(12) United States Patent
Yuasa (10) Patent No.: US 6,329,018 B1
(45) Date of Patent: Dec. 11, 2001

(54) METHOD OF AND A TOOL ASSEMBLY FOR DRAWING LINEAR FIGURES

(75) Inventor: Toshinao Yuasa, Hirakata (JP)

(73) Assignee: Sakura Color Products Corp., Osaka (JP)

( * ) Notice: Subject to any disclaimer, the term of this patent is extended or adjusted under 35 U.S.C. 154(b) by 0 days.

(21) Appl. No.: 09/545,981

(22) Filed: Apr. 10, 2000

(30) Foreign Application Priority Data

Apr. 16, 1999 (JP) .................................................. 11-109811

(51) Int. Cl.$^7$ ........................................................ B05D 5/06

(52) U.S. Cl. ..................... 427/272; 427/274; 427/277; 427/288

(58) Field of Search .................................. 427/271, 272, 427/274, 277, 288

(56) References Cited

U.S. PATENT DOCUMENTS 5,534,587 * 7/1996 Smith .................................... 524/575

* cited by examiner

*Primary Examiner*—Katherine A. Bareford
(74) *Attorney, Agent, or Firm*—Wood, Phillips, VanSanten, Clark & Mortimer (57) ABSTRACT

An applicator is used at first to apply to a paper sheet an ink that is composed of two or more pigments and/or dyestuffs of different adhesional forces to the paper sheet, so as form an ink layer on the sheet along a desire pattern. Next, an erasing rubber is used to scrub the ink layer along a desire locus, in a freehand manner. Alternatively, the scrubbing may be done through a template overlaid on the ink layer. As a result, the pigments or dyestuffs weakly adhering to the paper will be removed from it, with the other pigments or dyestuffs remaining on the sheet, thus forming a desired linear figure in accordance with the desired locus, such that an epoch-making ornamental and visual effect is afforded in the drawn linear figures by this novel method.

12 Claims, 12 Drawing Sheets

METHOD OF AND A TOOL ASSEMBLY FOR DRAWING LINEAR FIGURES

BACKGROUND OF THE INVENTION

1. Field of the Invention

The present invention relates to a method of drawing on a paper sheet linear figures such as pictures, letters and characters in such a manner as producing therein a peculiar visual effect.

2. Description of the Relevant Art

The linear figures such as pictures, letters and characters are usually drawn using some writing tools including ball-point pens, fountain pens and line-markers, or using certain painting tools including so me painting or calligraphic brushes and crayons. These tools known in the art will generally give pictures and/or characters that are composed fundamentally of simple and monochromatic lines.

SUMMARY OF THE INVENTION

An object of the present invention is to provide a method of drawing linear figures such that a novel and epoch-making visual effect is produced in the figures.

The method developed by the present inventors so as to give such a fresh visual effect to the drawn figures does comprise the steps of applying at first an ink to a paper sheet by using an ink applicator so as to form raw figures on the sheet, with the ink containing at least two colorants that include pigments and dyestuffs and are different in their adhesional strength of sticking themselves to the paper, and subsequently scrubbing the raw figures along a desired linear contour.

At the first step in the present method, the applicator will apply the ink to the paper sheet, and the ink comprises the two or more colorants that may be any pigments and/or dyestuffs.

Such a preliminary application of the ink may be done uniformly all over a desired area on the paper sheet, or alternatively in a manner to write letters or characters or to draw figures of a substantially linear pattern.

At the next step, areas, regions and/or zones in the letters, characters or figures thus written or drawn will be scrubbed with a proper means, along a desired contour or over a desired pattern. Preferably, the scrubbing or scouring means may be a rubber eraser. Although this eraser can be moved manually along any imaginary locus but without aid of any rules or formulating tools, it is recommended to use an appropriate formulating plate such as a writing or erasing templet (often called 'template'). This templet will intervene between the paper sheet and the scrubbing or scouring rubber eraser.

As mentioned above, the upper surface of the ink layer formed on the paper sheet will be scrubbed, wherein the ink contains two or more pigments and/or dyestuffs blended therein and mixed with each other. Therefore, one or more such colorants having a lower adhesional strength and weakly sticking to the paper will be removed therefrom by the scrubbing. The other colorants having a higher adhesional strength and firmly sticking to the paper remain thereon, so that a locus of the rubbing motion will appear as a linear pattern, design or figure.

The ink applicator used herein may preferably be a ball-point pen or a marking pen. The ink having blended therein the two or more kinds of colorants of different adhesional strength and preferably being stored in the applicator may preferably be any one or ones of metal powder-containing inks, double color-developing inks and pearl-glossy pigment-containing inks.

In the method of the present invention, the applicator is the ball-point pen or marking pen that is filled with the ink so that it can be applied to a paper sheet in the same manner as writing ordinary letters or characters or as drawing any designs or pictures. This ink is, as mentioned above, a metal powder-containing ink, a double color-developing ink or a pearl-glossy pigment-containing ink.

If the metal powder-containing ink is used, a limited amount of the metal powder in the ink will be eliminated from an area or region scrubbed with a rubber eraser or the like. The other dyestuffs and/or pigments in the ink will however not be removed from but will remain on the area of the paper sheet.

If the pearl-glossy pigment-containing ink is used, a limited amount of the pearl-glossy pigments in the ink will be eliminated from an area or region scrubbed with a rubber eraser or the like. The other dyestuffs and/or pigments in the ink will however not be removed from but will remain on the area of the paper sheet.

In the case of the double color-developing ink, a central zone of an ink stroke will become glossy or brilliant to give a surprising ornamental effect, if scrubbed with the rubber eraser or the like.

A proper amount of certain thixotropic polysaccharides or any derivative thereof may be added as a thickener to the ink containing the two or more dyestuffs and/or pigments which stick to the paper sheet with different strengths.

It is a matter of course that the present invention can be applied to any plane article other than paper sheets to be coated with the ink.

The present invention also provides a tool assembly for performing the method described above, wherein this assembly will comprise an ink applicator and a template. This applicator stores therein the ink containing a metal powder pigment mixed with a dyestuff sticking to a paper sheet with a higher strength than the former, and that template has at least one hollow region such as holes and cutouts of any desired configurations. Those ink applicator combined with the template for drawing desired figures may be packed in a container such as a box or bag.

Thus, the ink applicator and template both placed in the container of the tool assembly are ready for cooperative use to draw any desired linear figures.

The container may accommodate an ink-scrubbing rubber eraser in combination with the ink applicator that dispenses colorants sticking to the paper sheet with different adhesional strength. It may also be possible for the container to accommodate all the three tools, that is the ink applicator, the template and the ink-scrubbing rubber eraser, for better convenience to users.

BRIEF DESCRIPTION OF THE DRAWINGS

FIGS. 7(*a*), 7(*b*) and 7(*c*) are plan views of templates that are used in the embodiment shown in FIG. 6;

FIGS. 8(*a*), 8(*b*) and 8(*c*) are likewise plan views of other templates that are used in the embodiment shown in FIG. 6;

FIGS. 9(*a*) and 9(*b*) are plan views of the paper sheet on which yet another linear figure is being drawn in a yet still further embodiment;

THE PREFERRED EMBODIMENTS

Figure 1:
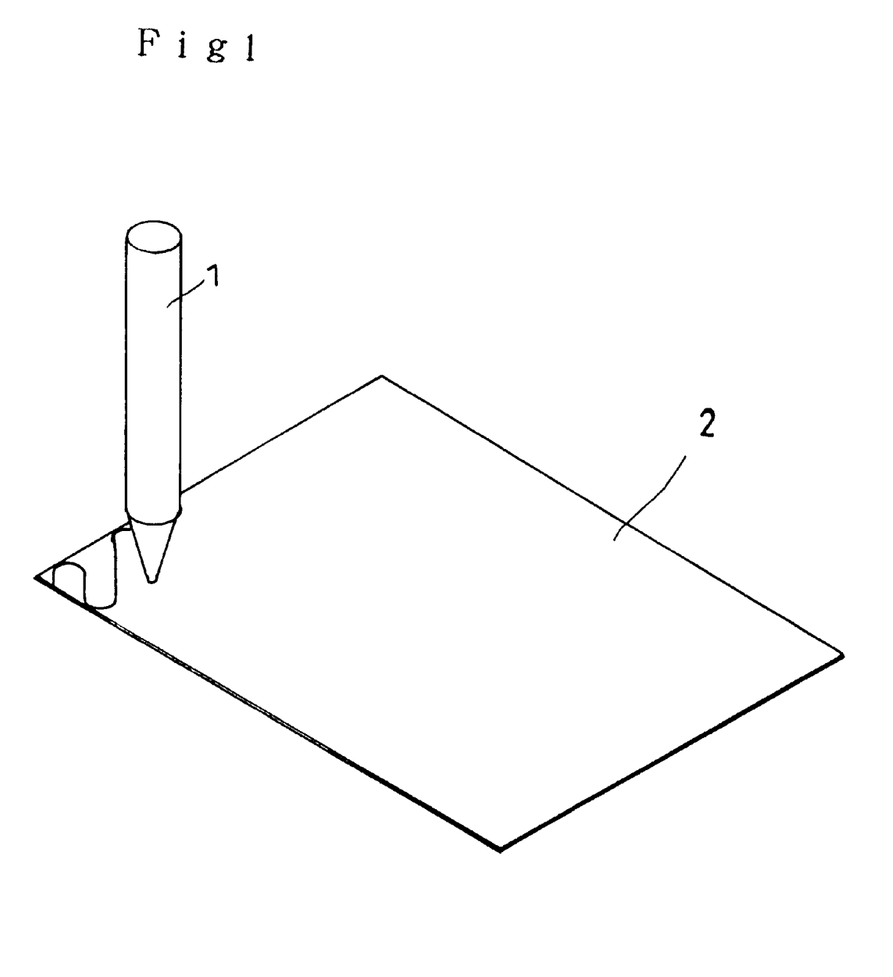
FIG. 1 is a perspective view of an ink applicator used to draw a linear figure on a paper sheet, shown at a first step of the present method of drawing linear figures.

In embodiments of the present invention, an ink applicator (viz., ball-point pen) 1 will be used to draw linear figures in a manner shown in FIG. 1, wherein the applicator stores therein an ink of a special type.

The ink applicator 1 is of the same structure as the prior art conventional ones. Any proper marking pen or any proper fountain pen may be used in place of such a ball-point pen.

The ink held in the applicator 1 comprises two or more pigments and/or dyestuffs mixed with each other as colorants having different adhesional strength of sticking themselves to a paper sheet. The ink of this type may for example a metal powder-containing ink, a double color-developing ink or a pearl-glossy pigment-containing ink.

Prior to detailed description of the steps constituting the method of drawing linear figures, property and nature of the ink stored in the ball-point pen 1 will be discussed at first and in detail.

The metal powder-containing ink, sometimes called 'metal powder pigment-containing ink' or 'metallic ink', does contain a proper amount of an aluminum powder or a brass powder as the metal powder pigment.

Not only the aluminum powder and brass powder but also a copper powder, a gold powder, a silver powder or the like may be used as the colorant in the metal powder-containing ink. However, the aluminum powder pigments will give an ink that affords an excellent effect inherent in the present invention.

As the aluminum powder pigments, the leafing type as well as the non-leafing type may be employed. In detail, they include 'ALPASTE WJPU75C', 'ibid. WE1200', 'ibid. WXM7675', 'ibid. WXM0630' (all being the product names from the Toyo Aluminum Co., Ltd.), '1110W', '2172SW' (both from the Showa Aluminum Co., Ltd.), 'AW-808C' and 'AW-7000R' (both from the Asahi Chemical Industries Co., Ltd.).

Alternatively, some colored aluminum pigments such as 'F500-RG'. 'F500BG-W' and 'F701RE-G' (all from the Showa Aluminum Co., Ltd.) may be used.

Examples of the brass powder pigments used as the metal powder pigments are: 'BS-605', 'BS-607' (both from the Toyo Aluminum Co., Ltd.), 'bronze powder P-555' and 'ibid. P-777' (both from the Nakajima Metallic Powders Co., Ltd.).

Any of, or any mixture of, these metal powder pigments may be used as the colorant.

If an average particle diameter of those pigments is extremely small, then metallic surface gloss of written characters will become poor. If on the contrary said diameter is excessively great, then the ink will not flow smoothly out of a penpoint tip, tending to clog it. Thus, an average diameter falling within a range from 5 to 30 $\mu$m, or more preferably within a narrower range from 5 to 15 $\mu$m will ensure a good manual writing property and a satisfactory printability.

The double color-developing ink mentioned above is an ink that contains a colorant or colorants of a higher permeability into the tissue of a paper sheet and a further colorant or colorants of a lower permeability. For example, this ink may consist of a metal powder pigment, a water-soluble dyestuff, water and a permeable organic solvent. This ink will be applied to the surface of a paper or a fabric so as to form thereon letters, characters, symbols, pictures and the like, each surrounded by a contour. The metal powder pigment will remain inside the contours, whilst the water-soluble dyestuff migrating sideways through the paper tissue so that rims formed outside the contours give a fantastic visual appearance to those written or drawn figures.

The double color-developing ink is, as summarized above, composed of the colorant less or scarcely permeable into paper or the like tissue, the further colorant more or highly permeable into same, water and the watersoluble organic solvent.

Preferably, an aluminum powder pigment, a brass powder pigment or the like metal powder pigment may be used as the scarcely permeable colorant. The ink of this type may be regarded as a 'metal powder-containing ink' defined above. The same examples of metal powder pigments will also apply here, so that they will not be listed again.

If an average particle diameter of those metal powder pigments is extremely small, then metallic surface gloss of written characters will become poor. If on the contrary said diameter is excessively great, then the ink will not flow smoothly out of a penpoint tip, tending to clog it. Thus, an average diameter falling within a range from 1 to 20 $\mu$m will ensure a good manual writing property.

Ordinary pigments other than metal powder pigments have been used in aqueous inks and can also be employed herein to be the scarcely permeable colorants. This kind of ordinary colorants include carbon black, titanium dioxide and the like inorganic pigments, quinacridon violet and the other quinacridon pigments, Hansa Yellow 10G and the like insoluble azoic pigments.

Any known dyestuffs or pigments may be used as the highly permeable colorant, provided that they can smoothly and readily be dissolved or dispersed in the solvent.

Such known dyestuffs are metal-complex dyes, acid dyes and basic dyes as listed below. The acid dyes include: benzene azoic dyes, pyrazolone azoic dyes, acetoacetic-anilde azoic dyes, naphthalene-derivative azoic dyes, deep-color-developing disazo dyes, highly-efficient disazo dyes, quinizarin dyes, bromoamine dyes, anthraquinone dyes, nitro dyes and the like. The direct dyes include: copper-plitlalocyanine dyes, benzine dyes, tolidine dyes, dianisidine dyes, stilbene diazo dyes, other diazo dyes each having a urea bond, azoic dyes each having a coupling group, diamine-diphenylamine azoic dyes, polyazo dyes each having azo groups in series, other polyazoic dyes, thiazole azo dyes, sulfonated pigments and the like. The basic dyes include: diphenyl-methane dyes, triphenyl-methane dyes, acridine dyes, di-(tri-)allyl methane dyes, quinonimine dyes, xanthene dyes, azoic dyes, polymethine dyes, azomethine dyes, diazomethine dyes, diazo-trimethine dyes, triazotrimethine dyes, triazole-azo dyes, thiazole-azo dyes, benzothiazole-azo dyes, and the like. Some carbonium dyes that may sometimes be classified in the basic dye group can also be used herein.

The pigments preferable herein are, for example, phthalocyanines, dioxadines, carbon black and the like. Fluorescent pigments may also be used.

Any of the colorants listed above may be used alone, or any two or more of them may be used in combination.

The water-soluble organic solvents noted above are alcohols, glycols, glycol ethers and the like. Preferable examples of such organic solvents are: dipropyleneglycol-monopropyl-ether, dipropyleneglycol-monomethylether, liexylene glycol and the like.

Dispersed stably in the pearl-glossy pigment-containing ink is a pigment of a pearl-like gloss and composed of fine mica powder, whose particles are coated with a layer of highly refractive metal oxide such as titanium dioxide, iron oxide or the like. Light beams will be refracted at a boundary between the metal oxide layer and each mica particle enclosed therein and having a lower refractive index on one hand, and also at another boundary between said layer and an ambient medium or matrix. Such a refraction of light beams give a pearly luster or a metallic luster to the ink of this type.

Examples of the pigment for this kind of ink are: 'Iriodin' series, 'Timiron MP' and 'Extender W' (all from the Merck Japan Co., Ltd.). The 'Iriodin' series includes the types: -100, -103, -111, -120, -123, -151, -153, -163, -173, -201, -211, -221, -223, -231, -205, -215, -217, -219, -225, -235, -249, -259, -289 and -299. The 'Timiron MP' series includes the types: -115, -1001, -47, -1005, -10 and -45SP.

In addition to the pearl-glossy pigments listed above, any known dyes and/or carbon black may be blended with such an ink so as vary its tone of color.

The so-called 'colored pearl-glossy pigments' may be used to dispense with the dyes, for the same purpose. Examples of these pigments are: 'Iriodin 300' series, 'Iriodin 500' series, 'Timiron MP-25', 'ibid. -20', 'Colorona Bronze', 'Colorona Light Blue' and 'Colorona Platina Silver' (all from the Merck Japan Co., Ltd.). The Iriodin 300 series includes the types: -300, -302, -303, -306, -309, -320, -323, -351 and -355. The Iriodin 500 series includes the types: -500, -502, -504, -505, -507, -520, -522, -524, -530, -532 and -534. These pigments make it possible to obtain any desired tone of color, without aid of dyestuffs, and nevertheless enhancing light-resistance and water-resistance of the pearl-glossy ink.

If the average particle diameter of the pearl-glossy pigments is much smaller than an optimum value, then written characters or the like will be of an unsatisfactory luster. If contrarily said diameter is much greater than the optimum, then the penpoint tip is likely to be clogged with that ink not flowing smoothly. The pigment's average diameter falling within a range of 5–60 $\mu$m will provide an ink of excellent writing and printing properties.

In general, certain thickeners are added to aqueous inks so as to raise viscosity thereof. The thickeners suited to the ink stored in the ball-point pen 1 of the present invention are thixotropic polysaccharides and derivatives thereof Any thixotropic polysaccharide or its derivative as the thickener will facilitate preparation of the ink of 'gel' type. Due to thixotropicity, this ink will show a lowered viscosity when passing by a rotating writing ball, thus affording a desirable performance to the pen filled with such an aqueous ink.

Particularly preferable thickeners are natural polysaccharides and derivatives thereof, any of the microbial type, water-soluble vegetable type and water-soluble animal type.

Examples of the microbial polysaccharides and derivatives are: 'pluran', xanthan gum, welan gum, rhamsan gum, succinoglucan, dextran and the like. Examples of the vegetable polysaccharides and derivatives are: tragacanth gum, guar gum, tara gum, locust bean gum, ghatti gum, arabinogalactan gum, gum arabic, quince seed gum, pectin, starch, psyllium seed gum, carrageenan, alginic acid, agar and the like. Examples of the animal polysaccharides and derivatives are: gelatin, casein and the like.

Among these thickeners, the microbial ones are most suited to the ink containing an aluminum powder pigment, because they prolong its pot life and improve its writing performance.

Recommended especially for the ink of this type is rhamsan gum, and a preferable example thereof is the product 'K7C 233' made by the Sansho Co., Ltd.

Viscosity of the metal powder-containing ink may desirably be regulated to fall within a range of 2000–40000 mPa·s at 20° C. in order to prevent the aluminum powder or the like metal powder pigment from precipitation in the ink and also to improve the ink's writing and printing property. An optimum range of viscosity is from 3000 to 15000 mPa·s at 20° C. for the ink of this type.

The viscosity data referred to herein are all measured using an 'ELD' type viscometer with a cone rotor (viz., 3° rotor of R14 type) spinning at 0.5 rpm.

Viscosity of the double color-developing ink may desirably be regulated to fall within a range of 1000–10000 mPa·s at 20° C. in order to prevent the metal powder pigment from precipitation in the ink and also to improve the ink's writing and printing property. An optimum range is from 2000 to 5000 mPa·s at 20° C.

Viscosity of the pearl-glossy pigment-containing ink may desirably be regulated to fall within a range of 2000–40000 mPa·s at 20° C. in order to prevent the aluminum powder or the like metal powder pigment from precipitation in the ink and also to improve the ink's writing and printing property. An optimum range of viscosity of this ink is from 3000 to 15000 mPa·s at 20° C.

A content of the polysaccharides or derivatives is preferably from 0.01 to 4% by weight, more preferably from 0.3 to 2% by weight, in each ink composition. A poorer content will impair dispersion of the metal powder or the like pigment, causing precipitation thereof. An excessive content will however make the ink too viscous to smoothly flow in the writing or printing use.

Any proper stabilizer such as sodium benzoate or the like sodium carboxylate may be added to the ink, if necessary.

Similarly to the prior art ordinary inks, the ink used herein may further contain any one or more of additives such as dyestuffs, surfactants, dispersants, anti-corrosion agents, pH regulators, anti-rusting agents, antifoaming agents and the like.

Now, some embodiments of the present method of drawing linear figures will be described.

Figure 2:
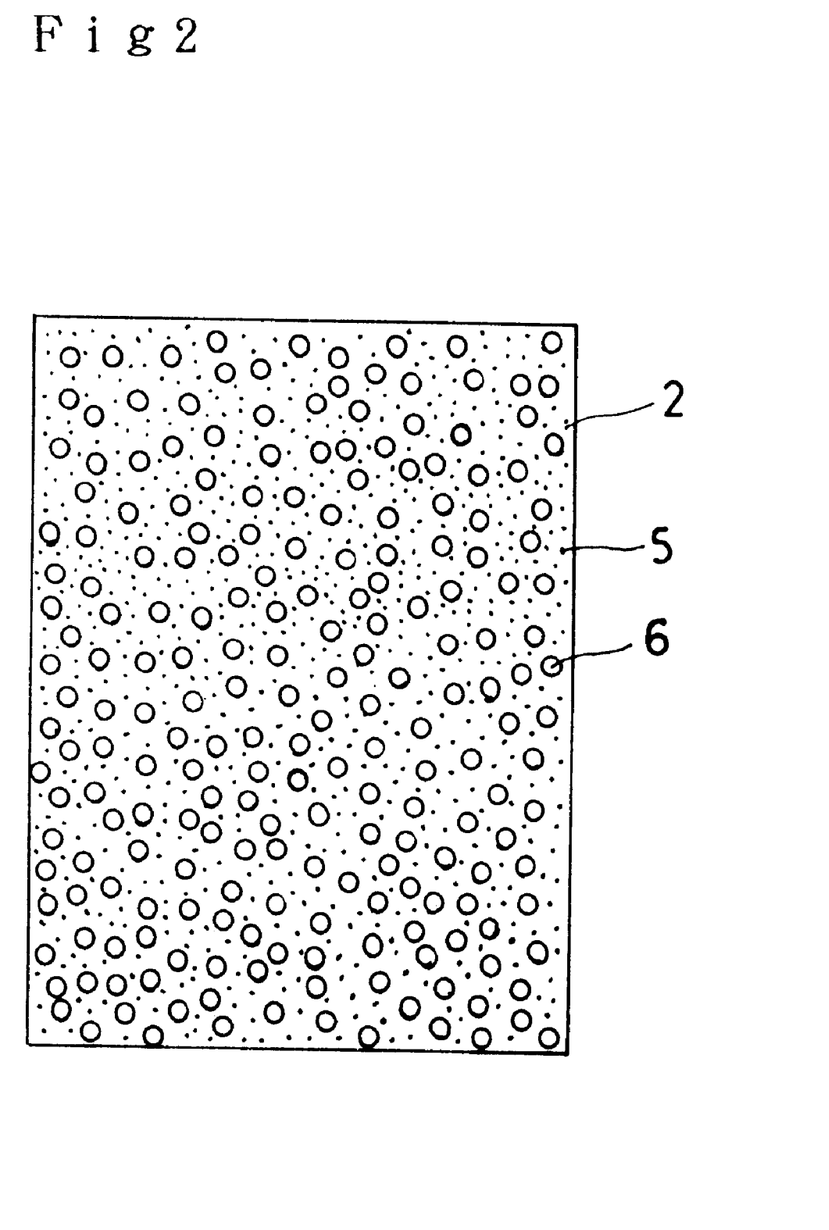
FIG. 2 is a plan view of the paper sheet at a further step subsequent to that shown in FIG. 1.

In one embodiment, a ball-point pen 1 is used to apply the ink to a desired area or to the whole surface of a paper sheet 2, as shown in FIG. 2.

Dyestuff particles or molecules 5 in the thus painted ink adhere firmly to the paper sheet 2 (as illustrated with small dots in FIG. 2). Metal powder or the like pigment particles 6 will however stick weakly to the paper sheet 2 (as shown with larger dots in FIG. 2). Those smaller dots 5 of one original color and larger dots 6 of another original color are intimately and uniformly mixed with each other. The ink layer thus formed will have an intermediate color between those original colors will appear.

Figure 3:
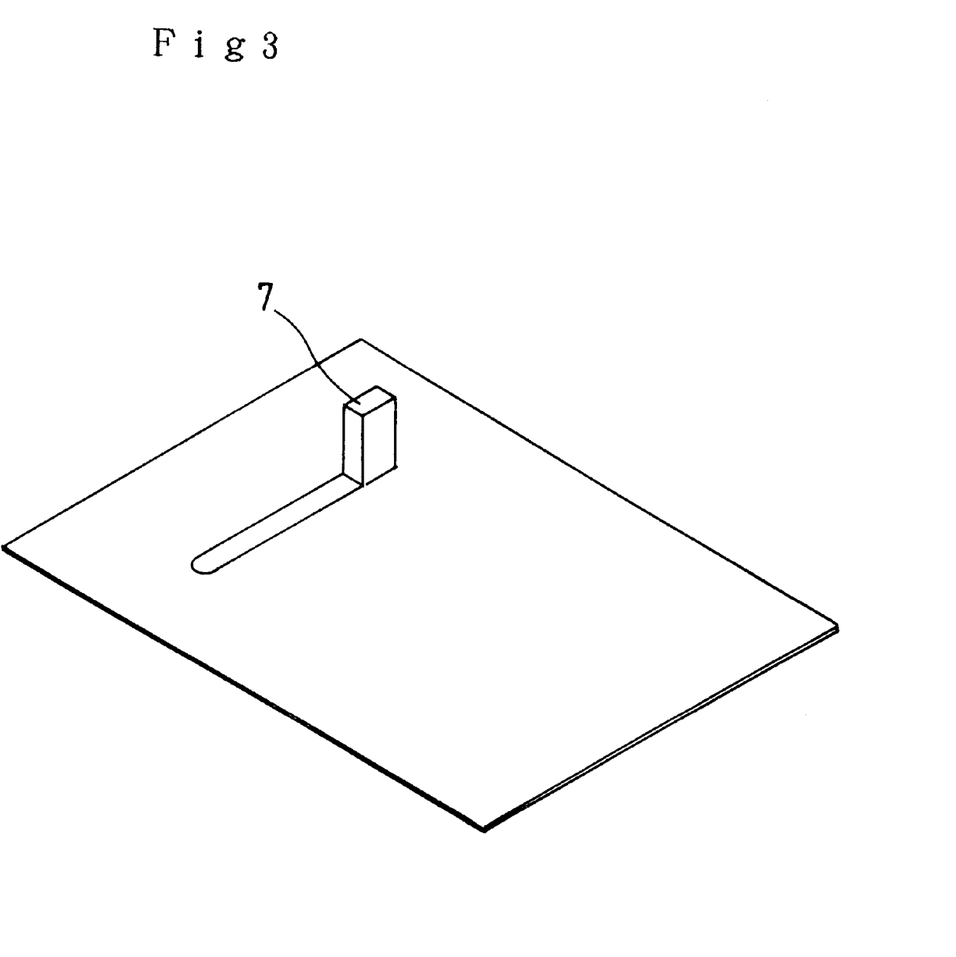
FIG. 3 is a plan view of the paper sheet at a still further step subsequent to that shown in FIG. 2.

Next, an eraser 7 pressed on the paper sheet 2 (see FIG. 3) repeats to scrub the ink layer along any desired pattern, for example making strokes of three Japanese syllabic characters 'sa', 'ku' and 'ra'.

Figure 4:
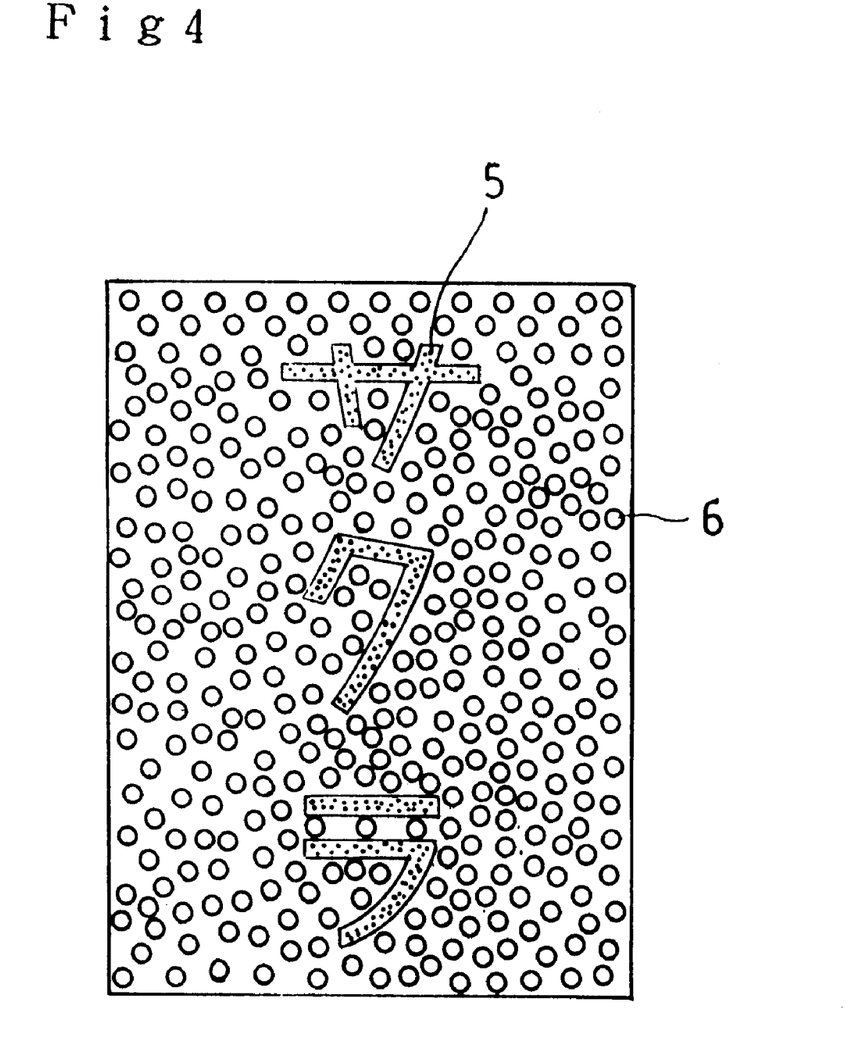
FIG. 4 is a plan view of the paper sheet on which the linear figure has been drawn in an embodiment of the present method.

As a result, only the pigment particles 6 are removed by the erasing rubber 7 from the scrubbed areas of the ink layer, thus letting the three characters 'sa', 'ku' and 'ra' loom on the paper sheet 2 (see FIG. 4). Background around them is of a sordid intermediate color that is a mixture of the original colors of the dyestuff 5 and the pigment 6. In contrast the background, those scrubbed areas are of a pure and brilliant color inherent in the dyestuff 5 not mixed with the pigment 6.

In the first embodiment described just above, the paper sheet 2 is painted all over at first before scrubbing with the eraser 7. However, linear figures such as pictures, letters or characters may be drawn or written at first on a fresh paper sheet 2. The eraser 7 will be used in this case to scrub portions of each figure, letter or character, for the purpose of interesting decoration thereof.

Figure 5:
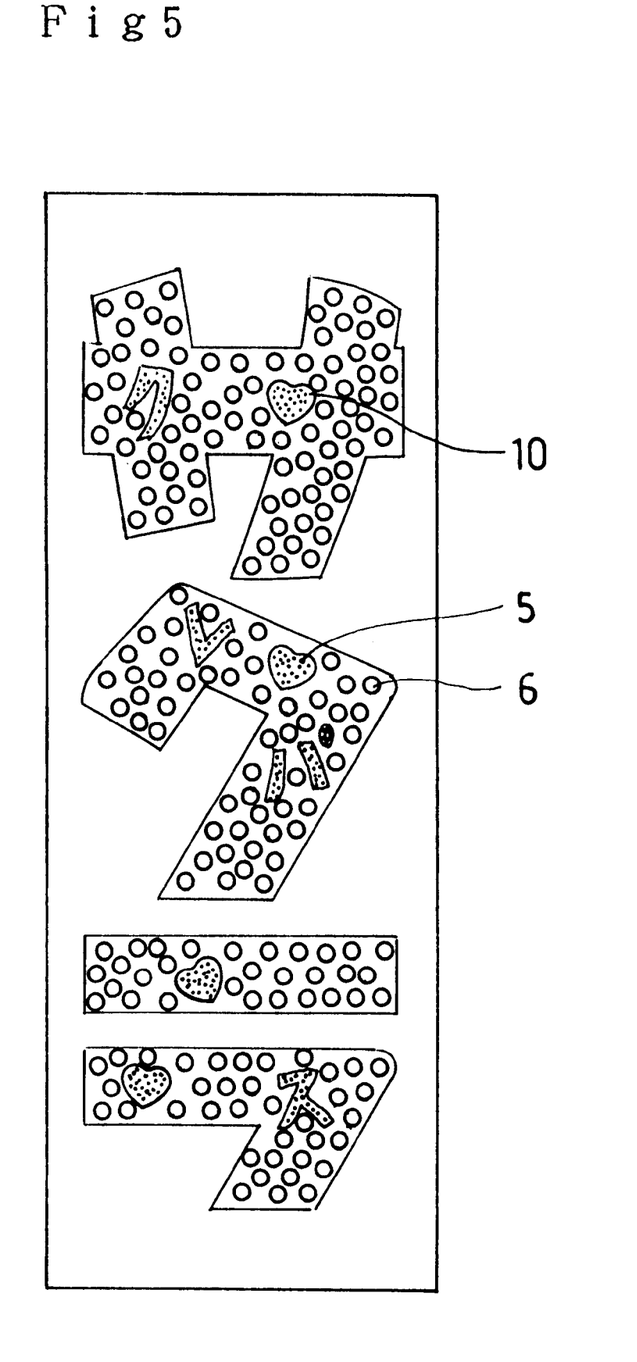
FIG. 5 is a plan view of the paper sheet on which another linear figure has been drawn in a further embodiment of the present method.

FIG. 5 illustrates a second embodiment wherein portions of each written character on a paper sheet 2 are scrubbed with the erasing rubber 7. For example in this embodiment, three Japanese characters 'sa', 'ku' and 'ra' will be written on the sheet, using the pen 1. Then, the rubber 7 will scrub paper regions along any desired loci, for instance of four other Japanese characters 'ku', 're', 'pa' and 'su' In contrast with a sordid intermediate color that is a mixture of the original colors of the dyestuff 5 and pigment 6 both forming the background characters 'sa', 'ku' and 'ra', those scrubbed areas giving the superimposed characters 'ku', 're', 'pa' and 'su' are each of a pure and brilliant color inherent in the dyestuff 5 not mixed with the pigment 6.

Figure 6:
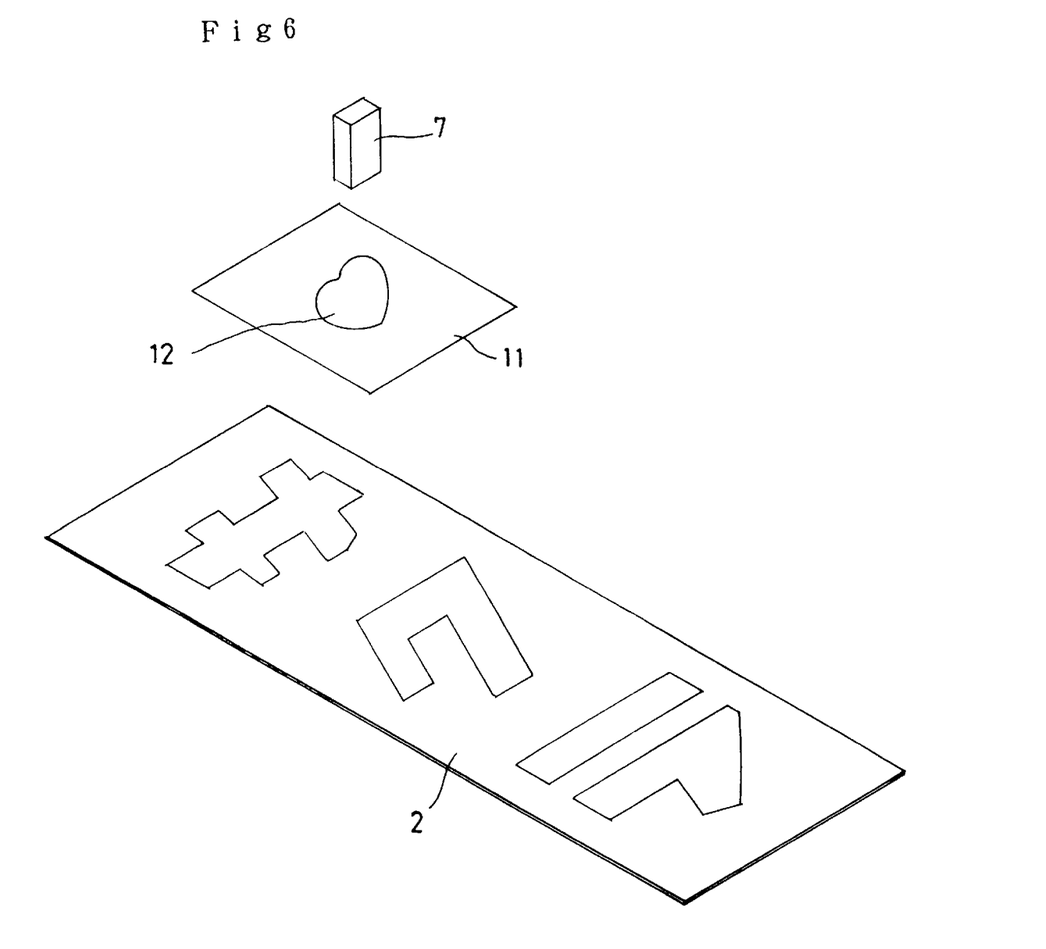
FIG. 6 is a perspective view of the paper sheet on which another linear figure is being drawn in a still further embodiment of the present method of drawing linear figures.
Figure 7:
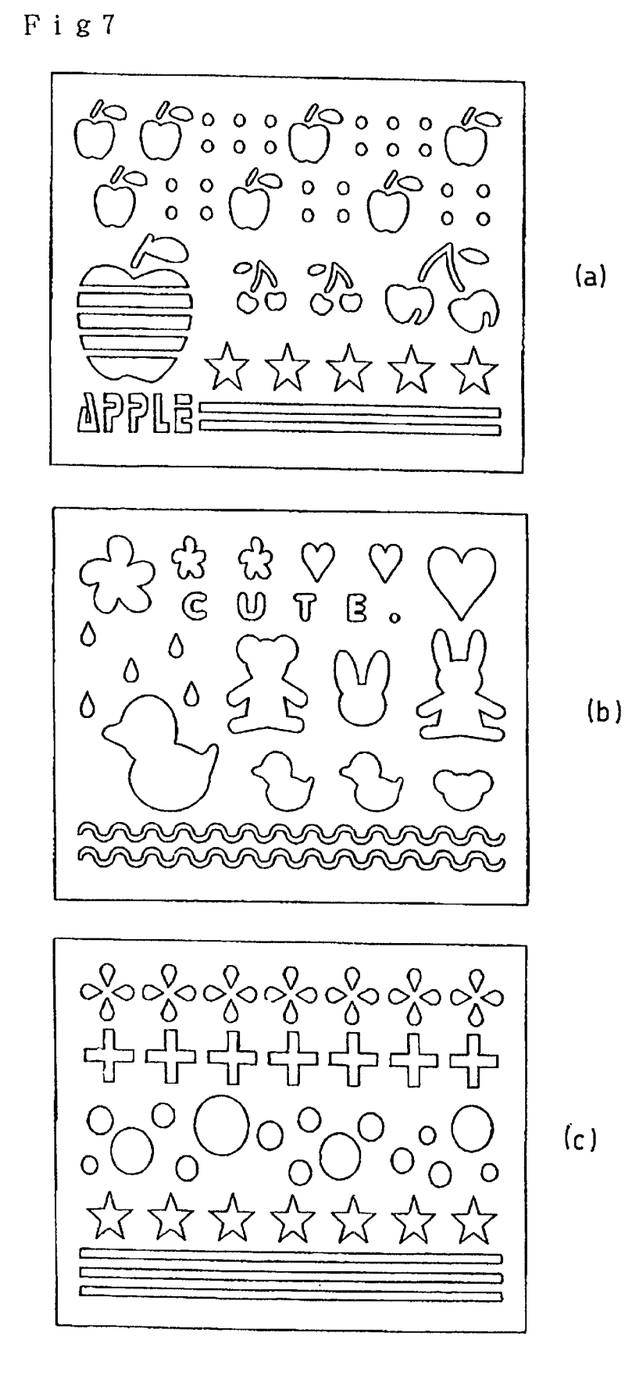
Figure 8:
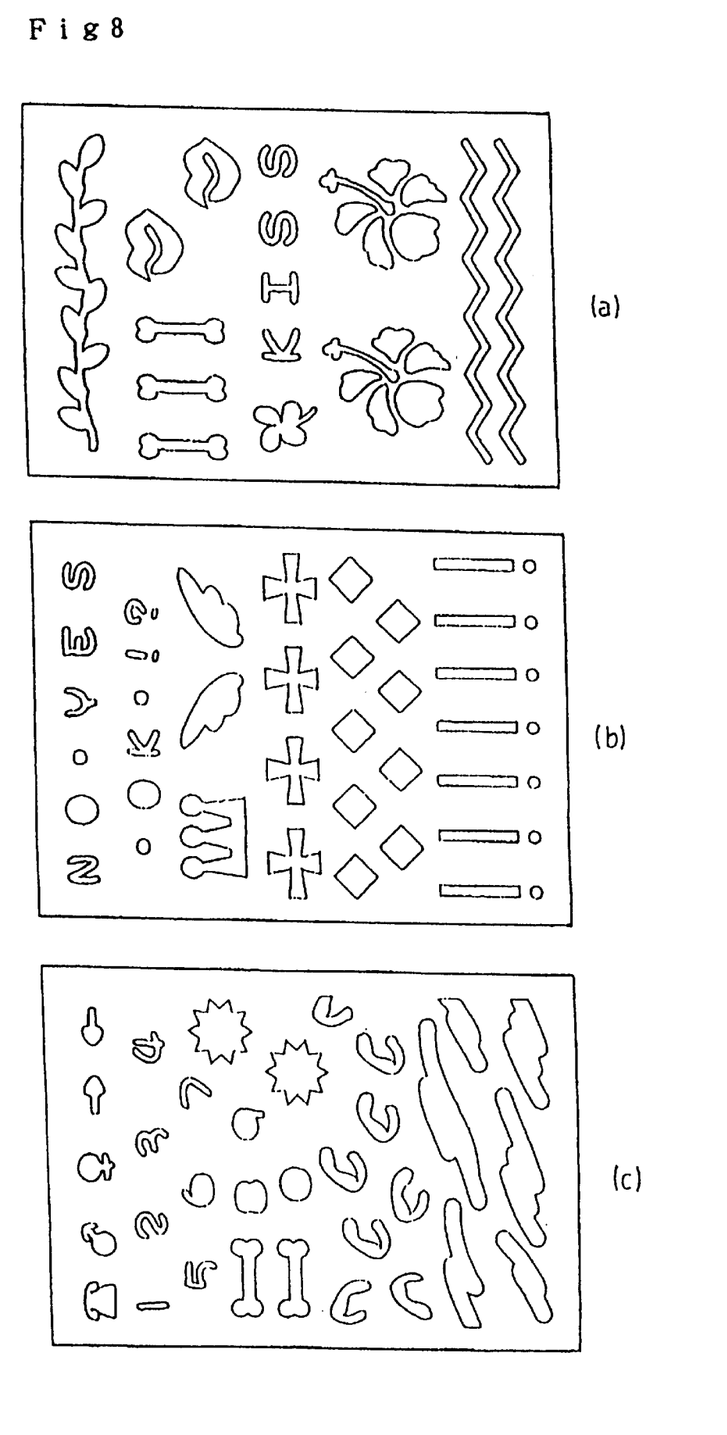

In addition to or in place of such superimposed characters, any decorative patterns such as hearts 10 may be formed in the written strokes of the background characters. Although the erasing rubber 7 may be moved in a freehand manner, any writing or erasing template 11 as shown in FIG. 6 may be put on the paper sheet 2 so that the rubber acts only on the paper surface region exposed through an opening 12 of the template. The pigment particles 6 will thus be eliminated by the rubber 7 from the heart-shaped region, easily and exactly.

Various sorts of templates employable herein are exemplified in FIGS. 7(a) to 8(c).

A double-color developing ink will give a unique ornamental effect.

Figure 9:
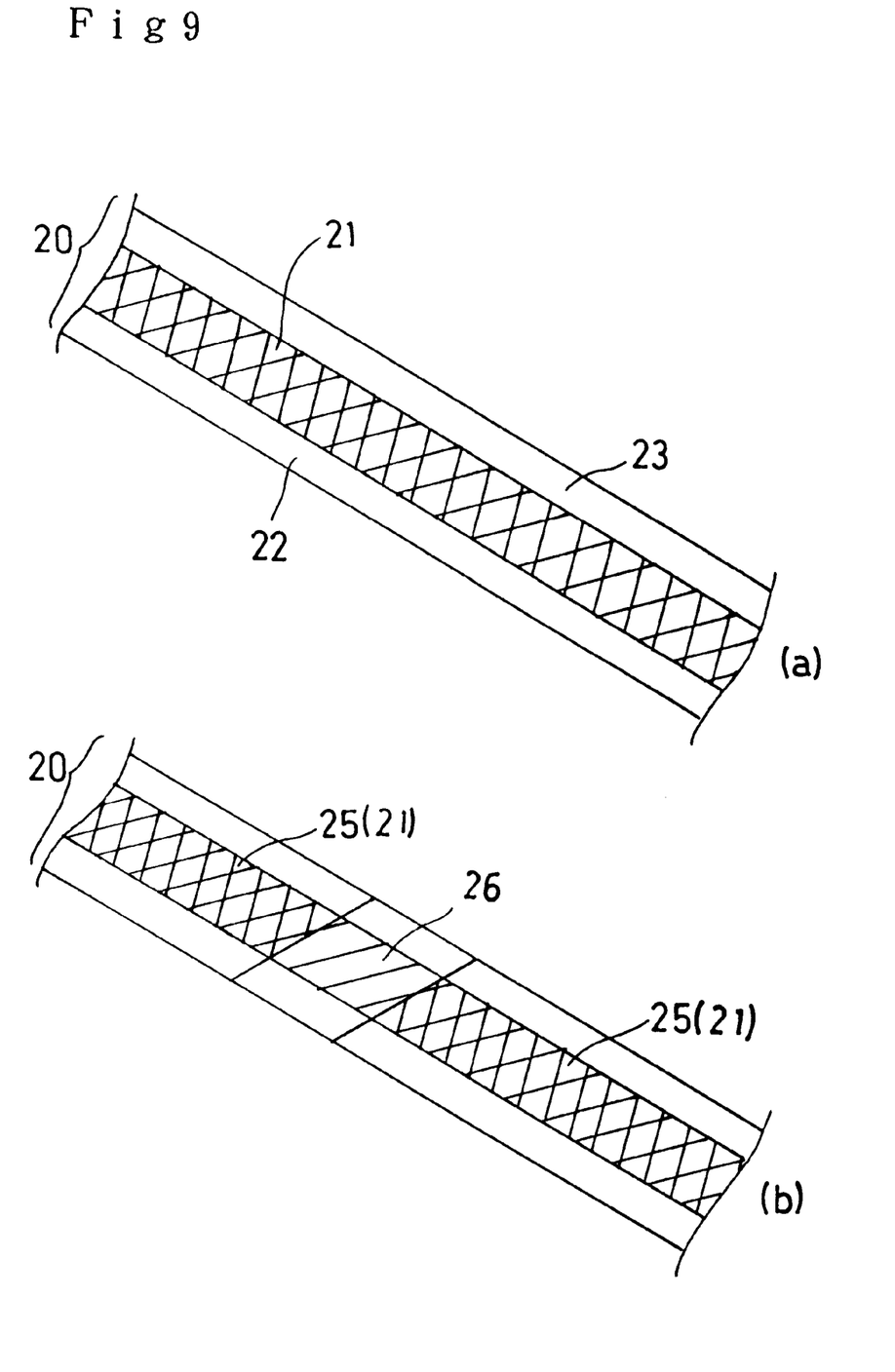

If a ball-point pen 1 filled with this ink is used to write a line 20 on a paper sheet 2, as shown in FIG. 9(a), a middle core zone 21 will be colored with both the metal powder pigment and the dyestuff. The core zone is thus rimmed with lateral hems 22 and 23 extending along and adjacent to said zone, due to lateral migration of the dyestuff.

If any portions of the line 20 are scrubbed with the erasing rubber 7, then the middle zone 21 of this line will partly lose the metal pigment particles. These portions will be of a color that differs not only from the remainder of the middle zone line but also from the hems 22 and 23.

Thus, three-toned color will appear, composed of the color-mixture regions 25, the dyestuff-colored portions 26 and the migration-colored hems 22 and 23.

Figure 10:
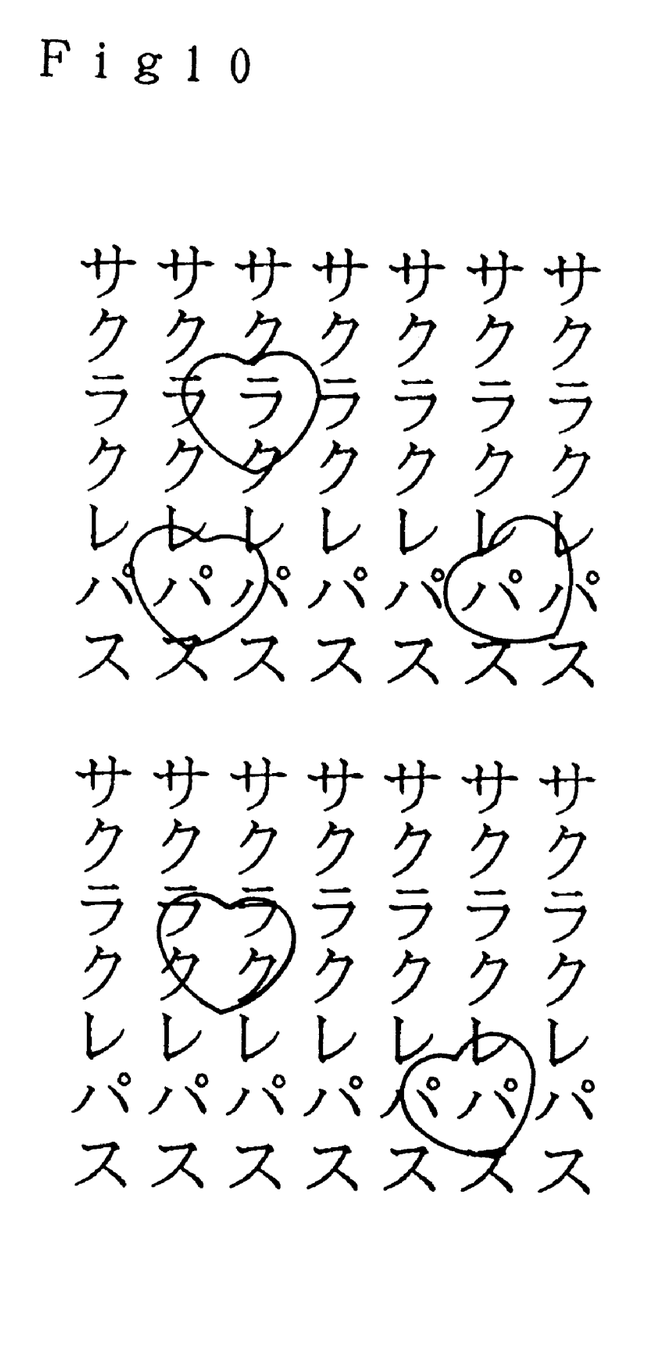
FIG. 10 is a plan view of the linear figure outlined in FIGS. 9(*a*) and 9(*b*) and shown on a larger scale.

In an example shown in FIG. 10, several groups of seven Japanese characters 'sa', 'ku' 'ra', 'ku', 're', 'pa' and 'su' may be written using an ink applicator 1. Subsequently, a heart-shaped template 10 will be placed on the paper sheet so as to scrub heart areas, so that dyestuff-colored portions 26 and the migration-colored portions 22 and 23 do provide a two-tone. The other areas outside the hearts will thus be of another two-tone composed of the mixed-color portions 25 (which the pigment and dyestuff produce) and the migration-colored portions 22 and 23.

Figure 11:
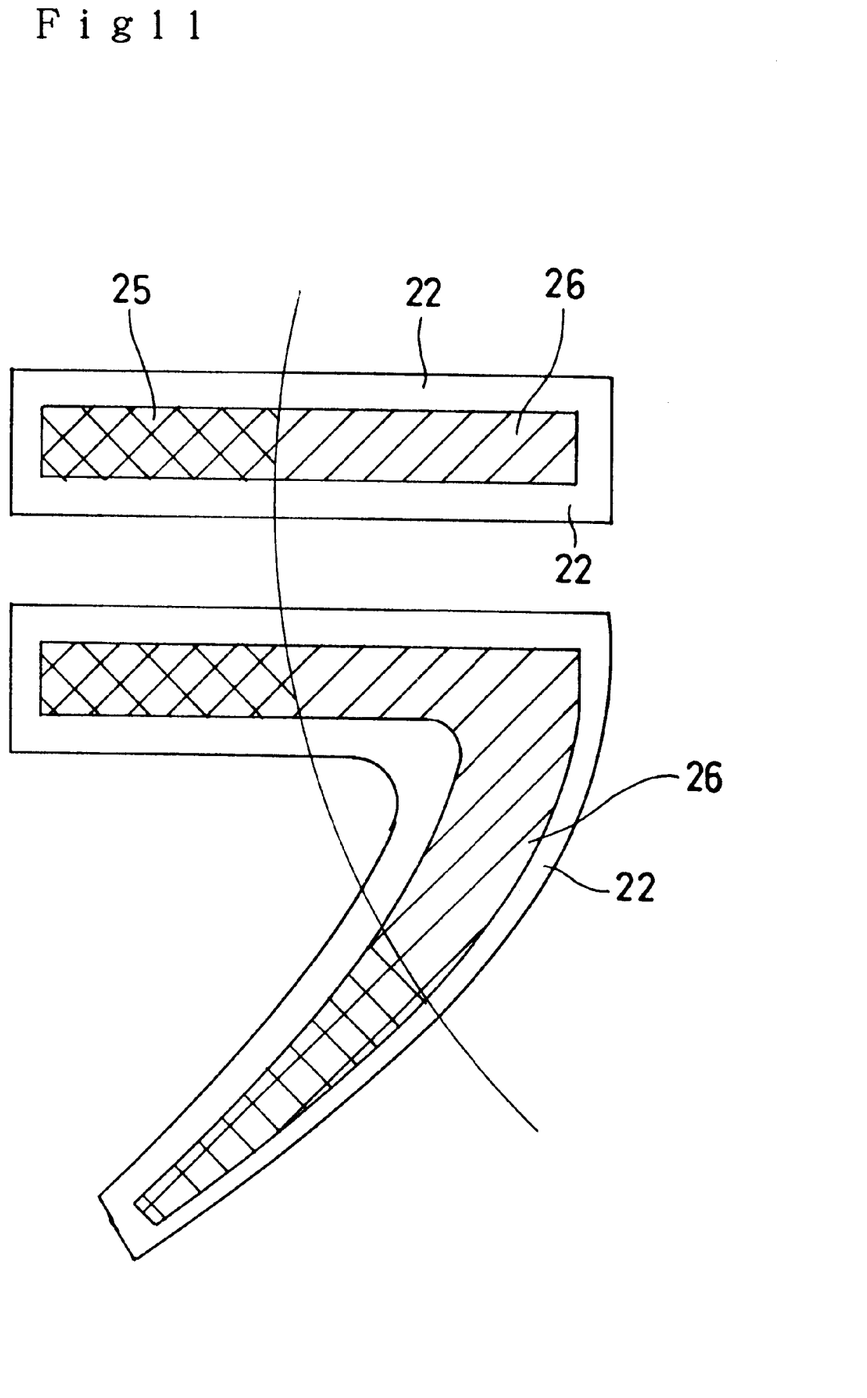
FIG. 11 is a plan view of a part of the linear figure summarized in FIG. 10 and much more enlarged.

FIG. 11 illustrates in detail this example, wherein a right half of the character 'ra' is ornamented with the two-tone comprising the dyestuff-colored portions 26 and the migration-colored hems 22 and 23. A left-side remainder is of another two-tone comprising the mixed-color portions 25 and the migration hems 22 and 23.

In the foregoing embodiments, the erasing rubber 7 is recommended to scrub the ink layer on a paper sheet, because its power of scrubbing is high. However, ordinary rubber pieces or ordinary fabrics or cloths may also be used though their scrubbing effect is not necessarily excellent.

Figure 12:
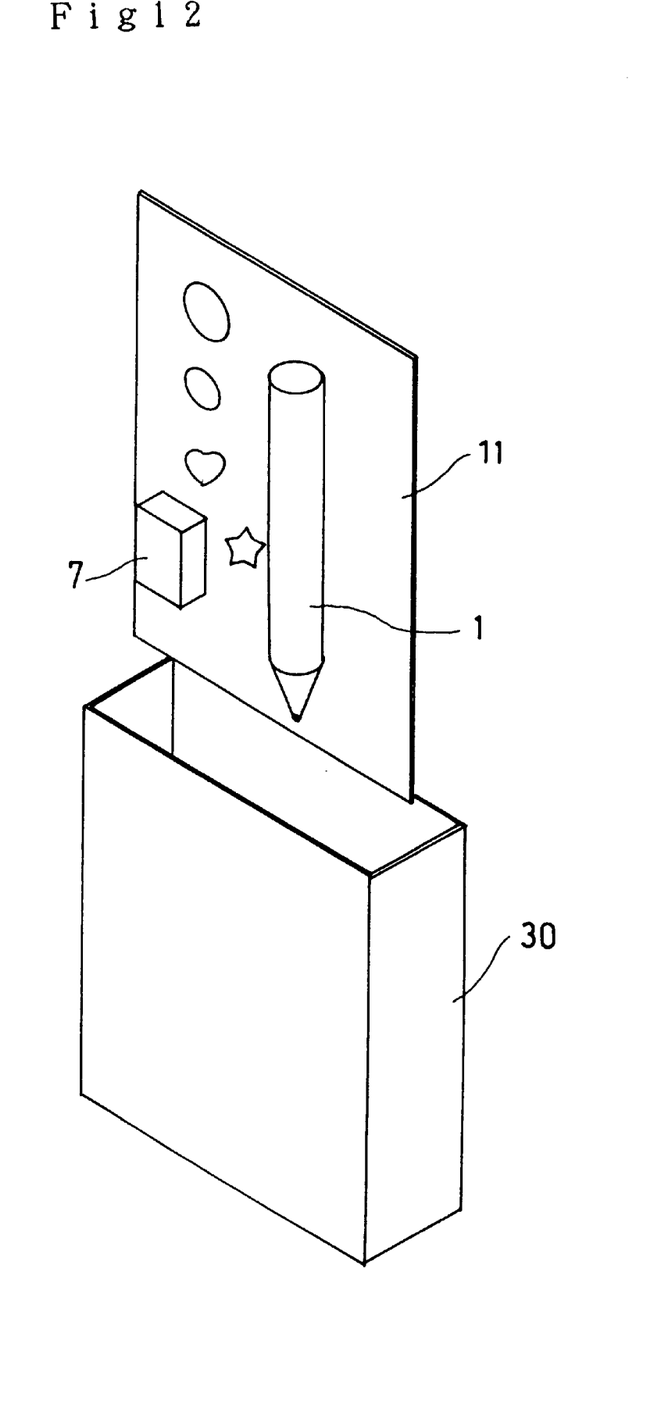
FIG. 12 is a perspective view of a tool assembly provided herein to draw linear figures.

It is desirable to pack all the ball-point pen 1, erasing rubber 7 and template 11 in a single box or bag 30, as shown in FIG. 12. Such a package will be convenient and beneficial in selling or carrying those tools in a three-piece set.

In summary, an ink applicator filled with an ink composed of two or more dyestuffs and/or pigments of different adhesional or sticking forces to paper sheets will be applied thereto. Subsequent to this step, the applied ink layer will be scrubbed along any desired patterns so as to highlight or cause the scrubbed regions to loom from an ambient background, thereby producing an epoch-making ornamental effect.

In a case wherein a template is overlaid on the applied ink layer, the partial scrubbing thereof can easily be made any desired times.

The ink applicator for the ink composed of pigments and dyestuffs is preferably combined with a template having any desired pattern of openings for drawing linear figures, for the sake of convenient carriage.

What is claimed is:

1. A method of drawing linear figures, said method comprising the steps of:

applying to a sheet surface an ink comprising a) at least one colorant that has a first permeability with respect to the sheet surface and b) at least a second colorant that has a second permeability with respect to the sheet surface that is greater than the first permeability, over a prescribed area so that the at least the second colorant migrates through the sheet surface outside of the prescribed area by a substantial distance such that a clearly visible color contrast with the ink within the prescribed area is formed; and scrubbing the ink within the prescribed area to change the appearance of the ink within at least a part of the prescribed area.

2. The method as defined in claim 1, wherein the ink is applied through an applicator that is selected from the group consisting of a ball-point pen and a marking pen.

3. The method as defined in claim 1, wherein the scrubbing of the ink layer is done with use of an erasing rubber.

4. The method as defined in claim 1, wherein the application of the ink is done along a desired locus.

5. The method as defined in claim 1, wherein the scrubbing of the ink layer is done through a template overlaid on the ink layer.

6. The method as defined in claim 1, wherein the ink containers a thickener selected from the group consisting of thixotropic polysaccharides and derivatives thereof.

7. The method of drawing linear figures according to claim 1 wherein the ink comprises a metal powder pigment, a water-soluble dyestuff, water and a permeable organic solvent.

8. The method of drawing linear figures according to claim 7 wherein the sheet surface comprises paper.

9. The method of drawing linear figures according to claim 7 wherein the sheet surface comprises fabric.

10. The method of drawing linear figures according to claim 1 wherein the ink comprises at least one of a) a metal powder pigment, b) a metal powder pigment comprising aluminum and c) a metal powder pigment comprising brass.

11. The method of drawing linear figures according to claim 1 wherein the ink comprises a metal powder-containing ink.

12. The method as defined in claim 1 herein the ink comprises pearl-glossy pigment-containing ink.

* * * * *